United States Patent
Smith et al.

(10) Patent No.: US 9,467,430 B2
(45) Date of Patent: *Oct. 11, 2016

(54) DEVICE, METHOD, AND SYSTEM FOR SECURE TRUST ANCHOR PROVISIONING AND PROTECTION USING TAMPER-RESISTANT HARDWARE

(71) Applicant: Intel Corporation, Santa Clara, CA (US)

(72) Inventors: Ned M. Smith, Hillsboro, OR (US); David Johnston, Beaverton, OR (US); George W. Cox, Lake Oswego, OR (US); Adi Shaliv, Nir-Banim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,757

(22) Filed: Feb. 10, 2015

(65) Prior Publication Data

US 2015/0319150 A1 Nov. 5, 2015

Related U.S. Application Data

(63) Continuation of application No. 13/631,562, filed on Sep. 28, 2012, now Pat. No. 8,954,735.

(51) Int. Cl.
*H04L 29/06* (2006.01)
*H04L 9/08* (2006.01)
*H04L 9/32* (2006.01)

(52) U.S. Cl.
CPC .......... *H04L 63/061* (2013.01); *H04L 9/0822* (2013.01); *H04L 9/0866* (2013.01); *H04L 9/3231* (2013.01); *H04L 63/0861* (2013.01); *H04L 2209/127* (2013.01)

(58) Field of Classification Search
CPC .... G06F 21/57; G06F 21/53; G06F 21/6218; G06F 21/60
See application file for complete search history.

(56) References Cited

U.S. PATENT DOCUMENTS 7,293,178 B2 11/2007 Evans et al.
7,702,925 B2 4/2010 Northcutt et al.
(Continued)

OTHER PUBLICATIONS

Dirk Balfanz, "FIDO U2F Raw Message Formats", FIDO Alliance Proposed Standard, May 14, 2015, pp. 1-10, FIDO Alliance.
Rolf Lindemann, "FIDO Security Reference", FIDO Alliance Proposed Standard, May 14, 2015, pp. 1-30, FIDO Alliance.
Dirk Balfanz, "FIDO U2F Implementation Considerations", FIDO Alliance Proposed Standard, May 14, 2015, pp. 1-5, FIDO Alliance.
Dirk Balfanz, FIDO U2F Javascript API, FIDO Alliance Proposed Standard, May 14, 2015, pp. 1-7, FIDO Alliance.
(Continued)

*Primary Examiner* — Mohammed Waliullah
(74) *Attorney, Agent, or Firm* — Trop, Pruner & Hu, P.C.

(57) ABSTRACT

A method and device for securely provisioning trust anchors includes generating a database wrapper key as a function of computing device hardware. The database wrapper key encrypts a key database when it is not in use by a trusted execution environment and may be generated using a Physical Unclonable Function (PUF). A local computing device establishes a secure connection and security protocols with a remote computing device. In establishing the secure connection, the local computing device and remote computing device may exchange and/or authenticate cryptographic keys, including Enhanced Privacy Identification (EPID) keys, and establish a session key and device identifier(s). One or more trust anchors are then provisioned depending on whether unilateral, bilateral, or multilateral trust is established. The local computing device may act as a group or domain controller in establishing multilateral trust. Any of the devices may also require user presence to be verified.

17 Claims, 6 Drawing Sheets

(56) References Cited

U.S. PATENT DOCUMENTS

| | | | |
|---|---|---|---|
| 8,954,735 B2 | 2/2015 | Smith et al. | |
| 2005/0021946 A1 | 1/2005 | Narayanan | |
| 2006/0104441 A1* | 5/2006 | Johansson | G06F 21/31 380/44 |
| 2008/0022121 A1* | 1/2008 | Fu | H04L 63/061 713/185 |
| 2008/0089514 A1* | 4/2008 | Futa | H04L 9/14 380/44 |
| 2011/0072266 A1* | 3/2011 | Takayama | G06F 21/445 713/169 |
| 2012/0173877 A1 | 7/2012 | Pendakur et al. | |
| 2012/0324234 A1* | 12/2012 | Hamid | G06F 21/31 713/183 |
| 2013/0010957 A1* | 1/2013 | Yu | H04L 9/0866 380/260 |
| 2013/0254636 A1* | 9/2013 | Kirkpatrick | H04L 9/0866 714/784 |
| 2014/0042627 A1* | 2/2014 | Edelstein | H04L 9/3278 257/758 |
| 2014/0075550 A1* | 3/2014 | Mirashrafi | G06F 21/31 726/19 |

OTHER PUBLICATIONS

Alexei Czeskis, "FIDO NFC Protocol Specification v1.0", FIDO Alliance Proposed Standard, May 14, 2015, pp. 1-5, FIDO Alliance.
Sampath Srinivas, "Universal 2nd Factor (U2F) Overview", FIDO Alliance Proposed Standard, May 14, 2015, pp. 1-5, FIDO Alliance.
Salah Machani, et al., "FIDO UAF Review Draft Spec Set", FIDO Alliance Proposed Standard, Dec. 8, 2014, pp. 1-202.
"Enhanced Privacy ID, A remote anonymous attestation scheme for hardware devices," available at http://www.drdobbs.com/security/enhanced-privacy-id/219501634, Sep. 8, 2009, 7 pages.
Krawczyk, Hugo, "SIGMA: the 'SIGn-and-MAc' Approach to Authenticated Diffie-Hellman and it's Use in the IKE Protocols," Jun. 12, 2003, 32 pages.
Brickell, Ernie, et al., "Enhanced Privacy ID using Bilinear Pairing," NIST Identity Based Encryption Workshop, Jun. 2008, 8 pages.
Paral, Zdenek (Sid), et al., "Reliable and Efficient PUF-Based Key Generation Using Pattern Matching," 6 pages.
Brickell, Ernie, et al., "Enhanced Privacy ID (EPID)," 22 pages.
Brickell, et al., "Enhanced Privacy ID: A Direct Anonymous Attestation Scheme with Enhanced Revocation Capabilities," Aug. 17, 2007, 36 pages.

* cited by examiner

DEVICE, METHOD, AND SYSTEM FOR SECURE TRUST ANCHOR PROVISIONING AND PROTECTION USING TAMPER-RESISTANT HARDWARE

CROSS-REFERENCE TO RELATED APPLICATION

The present application is a continuation application of U.S. application Ser. No. 13/631,562, entitled "DEVICE, METHOD, AND SYSTEM FOR SECURE TRUST ANCHOR PROVISIONING AND PROTECTION USING TAMPER-RESISTANT HARDWARE," which was filed on Sep. 28, 2012.

BACKGROUND

Developers have implemented various protocols for ensuring the security of information. Asymmetric cryptographic systems are used for authentication purposes and to exchange keys between entities. Additionally, public key certificates may be issued by, for example, a certificate authority to verify the authenticity of a particular entity's key signature or public key. Public Key Infrastructure (PKI) schemes are implemented in this way and a PKI validation path terminates at a trusted public key known as a trust anchor. Oftentimes, the public key of a certificate authority (CA) is such a trust anchor. PKI schemes rely on the trustworthiness and meticulousness of the certificate authority to ensure that the trust anchor is valid.

Entities interacting with one another sometimes require that their identities be kept secret from each other. In such circumstances, PKI schemes are inappropriate but other schemes may be used. For example, direct anonymous attestation and Enhanced Privacy Identification allow each entity to remain anonymous in an interaction. However, when a certificate authority or other third party is not used to establish a trust anchor, the entities must establish a trust anchor among themselves. In doing so, one or more of the entities may store public keys. If malware is able to modify or introduce new public keys to the key database of an entity, then an adversary may be able to induce the entity into trusting it. As such, in some implementations, public keys should be kept as safe as private keys to ensure optimal security.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
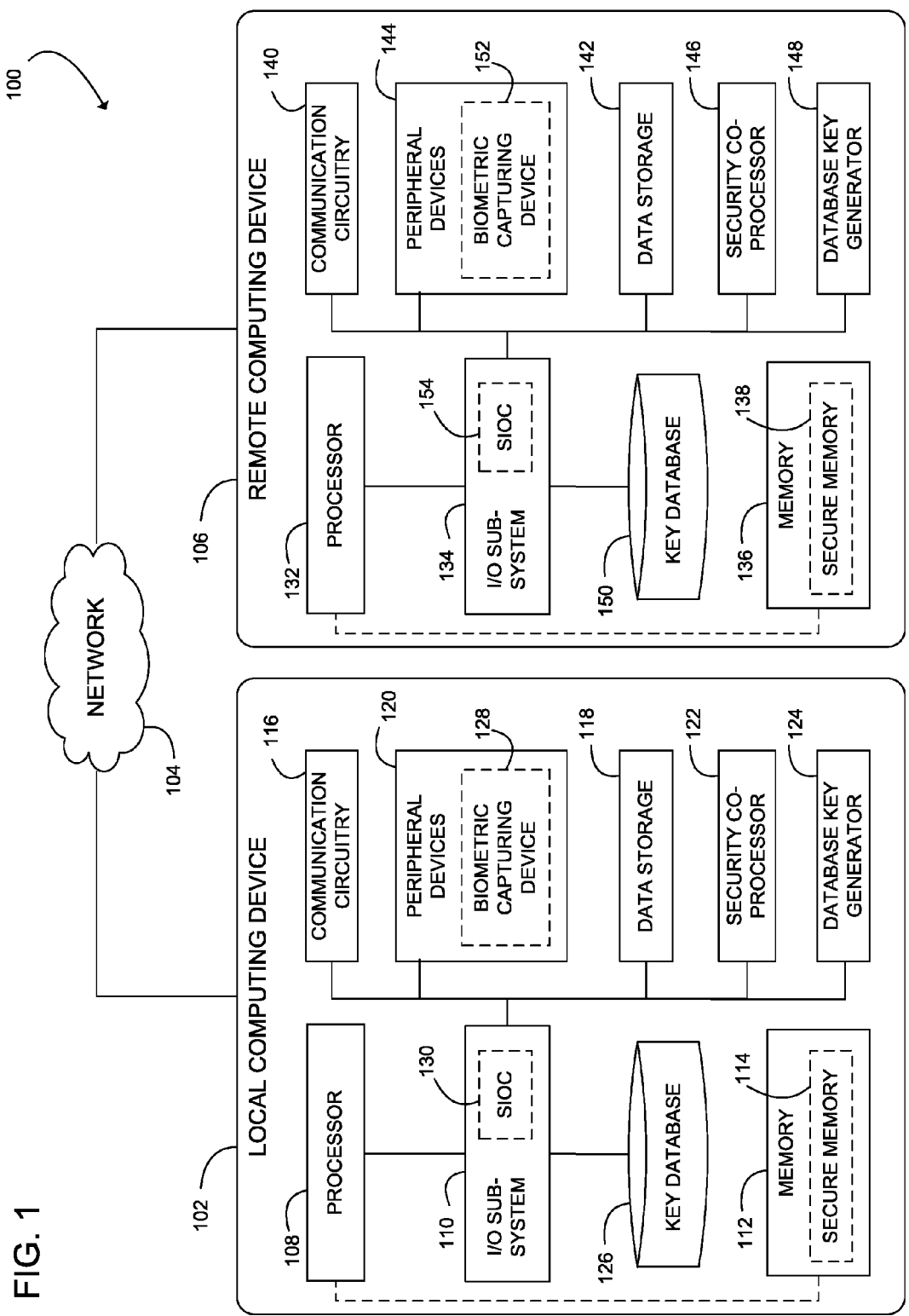
FIG. 1 is a simplified block diagram of at least one embodiment of a system for securely provisioning one or more trust anchors.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for securely provisioning one or more trust anchors includes a local computing device 102, a network 104, and a remote computing device 106. In use, as discussed in more detail below, the local computing device 102 and the remote computing device 106 may communicate with one another over the network 104 to establish one or more trust anchors and establish a unilateral, bilateral, or multilateral trust relationship. Although only one local computing device 102, one network 104, and one remote computing device 106 are illustratively shown in FIG. 1, the system 100 may include any number of local computing devices 102, networks 104, and remote computing device 106 in other embodiments. For example, as discussed in FIG. 6 below, the local computing device 102 may establish a multilateral trust relationship and act as a group or domain controller. In doing so, the local computing device 102 may communicate with multiple remote computing devices 106 (i.e., nodes) over one or more networks 104.

The local computing device 102 may be embodied as any type of computing device capable of performing the function described herein. For example, the local computing device 102 may be embodied as a desktop computer, a laptop computer, a mobile internet device, a handheld computer, a smart phone, a personal digital assistant, a telephony device, or other computing device. In the illustrative embodiment of FIG. 1, the local computing device 102 includes a processor 108, an I/O subsystem 110, a memory 112, a communication circuitry 116, a data storage device 118, one or more peripheral devices 120, a security co-processor 122, a database key generator 124, and a key database 126. As discussed in detail below, the local computing device 102 may also include a secure memory 114, a biometric capturing device 128, and a secure input/output circuitry 130. In some embodiments, several of the foregoing components may be incorporated on a motherboard of the local computing device 102, while other components may be communicatively coupled to the motherboard via, for example, a peripheral port. Furthermore, it should be appreciated that the local computing device 102 may include other components, sub-components, and devices commonly found in a computer and/or computing device, which are not illustrated in FIG. 1 for clarity of the description.

The processor 108 of the local computing device 102 may be embodied as any type of processor capable of executing software/firmware, such as a microprocessor, digital signal processor, microcontroller, or the like. In some embodiments, the processor 108 may be a single core processor having a processor core. However, in other embodiments, the processor 108 may be embodied as a multi-core processor having multiple processor cores. Additionally, the local computing device 102 may include additional processors 108, each having one or more processor cores.

The I/O subsystem 110 of the local computing device 102 may be embodied as circuitry and/or components to facilitate input/output operations with the processor 108 and/or other components of the local computing device 102. In some embodiments, the I/O subsystem 110 may be embodied as a memory controller hub (MCH or "northbridge"), an input/output controller hub (ICH or "southbridge"), and a firmware device. In such embodiments, the firmware device of the I/O subsystem 110 may be embodied as a memory device for storing Basic Input/Output System (BIOS) data and/or instructions and/or other information (e.g., a BIOS driver used during booting of the local computing device 102). However, in other embodiments, I/O subsystems having other configurations may be used. For example, in some embodiments, the I/O subsystem 110 may be embodied as a platform controller hub (PCH). In such embodiments, the memory controller hub (MCH) may be incorporated in or otherwise associated with the processor 108, and the processor 108 may communicate directly with the memory 112 (as shown by the hashed line in FIG. 1). Additionally, in other embodiments, the I/O subsystem 110 may form a portion of a system-on-a-chip (SoC) and be incorporated, along with the processor 108 and other components of the local computing device 102, on a single integrated circuit chip.

The processor 108 is communicatively coupled to the I/O subsystem 110 via a number of signal paths. These signal paths (and other signal paths illustrated in FIG. 1) may be embodied as any type of signal paths capable of facilitating communication between the components of the local computing device 102. For example, the signal paths may be embodied as any number of wires, cables, light guides, printed circuit board traces, via, bus, intervening devices, and/or the like.

The memory 112 of the local computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 112 is communicatively coupled to the I/O subsystem 110 via a number of signal paths. Although only a single memory device 112 is illustrated in FIG. 1, the local computing device 102 may include additional memory devices in other embodiments. Various data and software may be stored in the memory device 112. For example, one or more operating systems, applications, programs, libraries, and drivers that make up the software stack executed by the processor 108 may reside in memory 112 during execution. Furthermore, software and data stored in memory 112 may be swapped between the memory 112 and the data storage 118 as part of memory management operations.

The communication circuitry 116 of the local computing device 102 may be embodied as any number of devices and circuitry for enabling communications between the local computing device 102 and remote computing devices (e.g., the remote computing device 106) over the network 104. The network 104 may be embodied as any number of various wired and/or wireless communication networks. For example, the network 104 may be embodied as or otherwise include a local area network (LAN), a wide area network (WAN), or a publicly-accessible, global network such as the Internet. Additionally, the network 104 may include any number of additional devices to facilitate communication between the local computing device 102 and the remote computing device 106. The local computing device 102 and the remote computing device 106 may use any suitable communication protocol to communicate with each other over the network 104 depending on, for example, the particular type of network(s) 104. In some embodiments, the local computing device 102 and the remote computing device 106 may communicate with each other over the network 104 using a version of the standardized Internet Key Exchange (IKE) protocol. In other embodiments, the local computing device 102 and remote computing device 106 may communicate using a SIGMA Sign-and-MAC protocol (e.g., any variant of the SIGMA Sign-and-Mac algorithm including, but not limited to, SIGMA-I, SIGMA-R, SIGMA-4, and/or JFK).

The data storage device(s) 118 may be embodied as any type of device or devices configured for the short-term or long-term storage of data such as, for example, memory devices and circuits, memory cards, hard disk drives, solid-state drives, or other data storage devices. The encrypted key database 126 of the local computing device 102 may be stored in the data storage device 118. As discussed in more detail below, the key database 126 may be encrypted using a database wrapper key, which may be a symmetric cryptographic key generated as a function of hardware of the local computing device 102. For example, in some embodiments, the database wrapper key may be generated using a Physical Unclonable Function (PUF or PUFS) and/or PUF circuitry. The peripheral devices 120 of the local computing device 102 may include any number of peripheral or interface devices. For example, the peripheral devices 120 may include a display, a keyboard, a mouse, external speakers, and/or other peripheral devices. The particular devices included in the peripheral devices 120 may depend upon, for example, the intended use of the local computing device 102. The peripheral devices 120 are communicatively coupled to the I/O subsystem 110 via a number of signal paths thereby allowing the I/O subsystem 110 and/or processor 108 to receive inputs from and send outputs to the peripheral devices 120.

Figure 2:
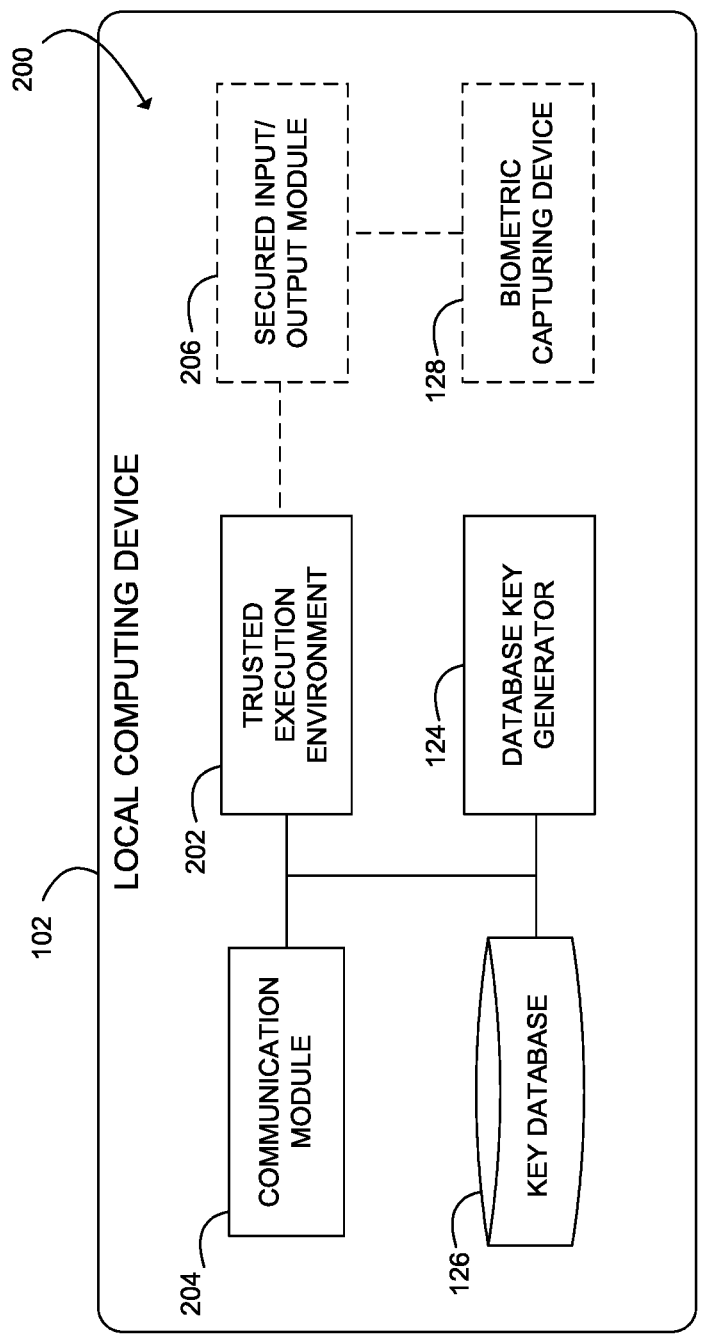
FIG. 2 is a simplified block diagram of at least one embodiment of a environment of a local computing device of the system of FIG. 1.

The security co-processor 122 may embodied as any hardware component(s) or circuitry capable of establishing a trusted execution environment 202 (see FIG. 2). For example, the security co-processor 122 may be embodied as a Trusted Platform Module (TPM), a manageability engine (ME), or an out-of-band processor. In some embodiments, a public Enhanced Privacy Identification (EPID) key and a private EPID key may be provisioned into the security co-processor 122 during the manufacturing process of the security co-processor 122. In other embodiments, EPID keys may be provisioned into one or more other components of the local computing device 102. As discussed in detail below, it should be appreciated that EPID keys are associated with a group having a single public EPID key. Any private EPID, of which there may be many, belonging to the group may be paired with the public EPID key as a valid public-private cryptographic pair. For example, the security co-processor 122 of the local computing device 102 may have one private EPID key and the security co-processor 146 of the remote computing device 106 may have a different private EPID key. If the security co-processor 122 and the security co-processor 146 are members of the same group, then both of their private EPID keys are valid asymmetric key pairs with the same public EPID key. As such, EPID keys allow both anonymity and unlinkability of the members. In other embodiments, another one-to-many cryptographic scheme may be used.

The database key generator 124 may embodied as any hardware component or circuitry capable of generating a database wrapper key as a function of the hardware of the local computing device 102. For example, the database key generator 124 may include PUF circuitry or circuit elements or otherwise use a tamper-resistant hardware entropy source (e.g., based on PUF technology) to generate the database wrapper key. In some embodiments, the database key generator 124 may also include error correction circuits or logic associated with the PUF circuitry. As discussed below, the database key generator 124 may be implemented upon boot of the local computing device 102 to generate the database wrapper key (i.e., a symmetric cryptographic key), which may be used to decrypt the key database 126. The key database 126 may be any electronic arrangement or structure suitable for storing cryptographic keys and unique device/entity identifiers. In the illustrative embodiment, the key database 126 is encrypted with the database wrapper key and stored in persistent storage such as, for example, the data storage device 118. In order to access cryptographic keys or otherwise update the key database 126, the trusted execution environment 202 retrieves the encrypted key database 126 from the data storage device 118 and decrypts the encrypted key database 126 with the database wrapper key.

The local computing device 102 may include the secure memory 114, the biometric capturing device 128, and the secure input/output circuitry 130 in embodiments that require user presence to be verified on the local computing device 102 to provision the trust anchor(s). In such embodiments, the secure input/output circuitry 130 may be included in the I/O subsystem 110 and is a hardware reinforced path to securely transfer media. Additionally, the memory 112 may include a portion of secure memory 114. The secure memory 114 may be used for hardware-enforced protection between the application(s) and hardware. In some embodiments, the secure memory 114 may be included on a processor graphics circuitry or a graphics peripheral card or may be a separate partition of the memory 112 for use by the processor graphics circuitry or graphics peripheral card. In one embodiment, Protected Audio Video Path (PAVP) and/or Protected Transaction Display (PTD) technology may be used to implement such hardware reinforced security using the secure memory 114 and the secure input/output circuitry 130. For example, in some embodiments, a Protected Transaction Display may be used to authenticate the user via a randomized Personal Identification Number (PIN) pad that is virtually displayed on a display of the local computing device 102 via a Protected Audio Video Path. Furthermore, it should be appreciated that alternative implementations of hardware reinforced security may use the secure memory 114 and the secure input/output circuitry 130 to verify user presence.

The biometric capturing device 128 may be embodied as any type of biometric capturing device that is capable of generating real-time biometric data of a user of the local computing device 102. For example, the biometric capturing device 128 may be embodied as a camera, such as a still camera, a video camera, or the like, that is capable of generating real-time images of a user of the local computing device 102. Alternatively or in addition, the biometric capturing device 128 may include a fingerprint scanner, handprint scanner, iris scanner, retinal scanner, or voice analyzer. The biometric capturing device may also include a biometric system, which may be embodied as any type of biometric system including multimodal biometric systems. In some embodiments, the biometric capturing device 128 may be incorporated into a housing of the local computing device 102. For example, the biometric capturing device 128 may be a camera incorporated near the display screen of the local computing device 102 (e.g., a webcam). In particular, the camera may capture the facial image of the current user of the local computing device 102. In other embodiments, the biometric capturing device 128 may be a peripheral device communicatively coupled to the local computing device 102.

The remote computing device 106 may be similar to the local computing device 102. As such, the remote computing device 106 may be embodied as any type of computing device capable of performing the functions described herein. In the illustrative embodiment of FIG. 1, the remote computing device 106 includes a processor 132, an I/O subsystem 134, a memory 136, a communication circuitry 140, a data storage device 142, one or more peripheral devices 144, a security co-processor 146, a database key generator 148, and a key database 150. The remote computing device 106 may also include a secure memory 138, a biometric capturing device 152, and a secured input/output circuitry 154. In some embodiments, several of the foregoing components may be incorporated on a motherboard of the remote computing device 106, while other components may be communicatively coupled to the motherboard via, for example, a peripheral port. Furthermore, it should be appreciated that the remote computing device 106 may include other components, sub-components, and devices commonly found in a computer and/or computing device, which are not illustrated in FIG. 1 for clarity of the description.

The processor 132, the I/O subsystem 134, the memory 136, the secure memory 138, the communication circuitry 140, the data storage device 142, the one or more peripheral devices 144, the security co-processor 146, the database key generator 148, the key database 150, the biometric capturing device 152, and the secure input/output circuitry 154 may be similar to the corresponding components of the local computing device 102 as described above. As such, the descriptions of such similar components of the local computing device 102 is equally applicable to the similar components of the remote computing device 106 and are not repeated herein for clarity of the description.

In use, as shown in FIG. 2, the local computing device 102 may establish an environment 200 for securely provisioning a trust anchor. The environment 200 in the illustrative embodiment includes a trusted execution environment 202, the database key generator 124, the key database 126, the communication module 204, a secured input/output module 206, and the biometric capturing device 128.

The trusted execution environment 202 may be implanted by the security co-processor 122 to establish a secure environment. In some embodiments, the cryptographic keys stored in the key database 126 may only be accessed by the trusted execution environment 202 when in use. When not in use, the key database 126 may be encrypted with the database wrapper key generated by the database key generator 124 and stored in the data storage device 118. In the illustrative embodiment of FIG. 2, the cryptographic key stored in the key database 126 and the database wrapper key generated by the database key generator 124 are inaccessible to the processor 108. As such, in some embodiments, only the trusted execution environment 202 may access the database wrapper key. In some embodiments, the environment 200 may also include the secured input/output module 206, which may be software/firmware designed to securely interact with the secure input/output circuitry 130 in the I/O subsystem 110 of the local computing device 102.

The communication module 204 may handle the communication between the local computing device 102 and remote computing devices, including the remote computing device 106, through the network 104. Each of the trusted execution environment 202, the database key generator 124, the key database 126, the communication module 204, the secured input/output module 206, and the biometric capturing device 128 may be embodied as hardware, software, firmware, or a combination thereof. It should be appreciated that the remote computing device 106 may establish an environment similar to the environment 200 for communicating with the local computing device 102 to establish one or more trust anchors. For example, the remote computing device 106 may also have a trusted execution environment that may communicate with the trusted execution environment 202 of the local computing device 102 through the communication module 204.

Figure 3:
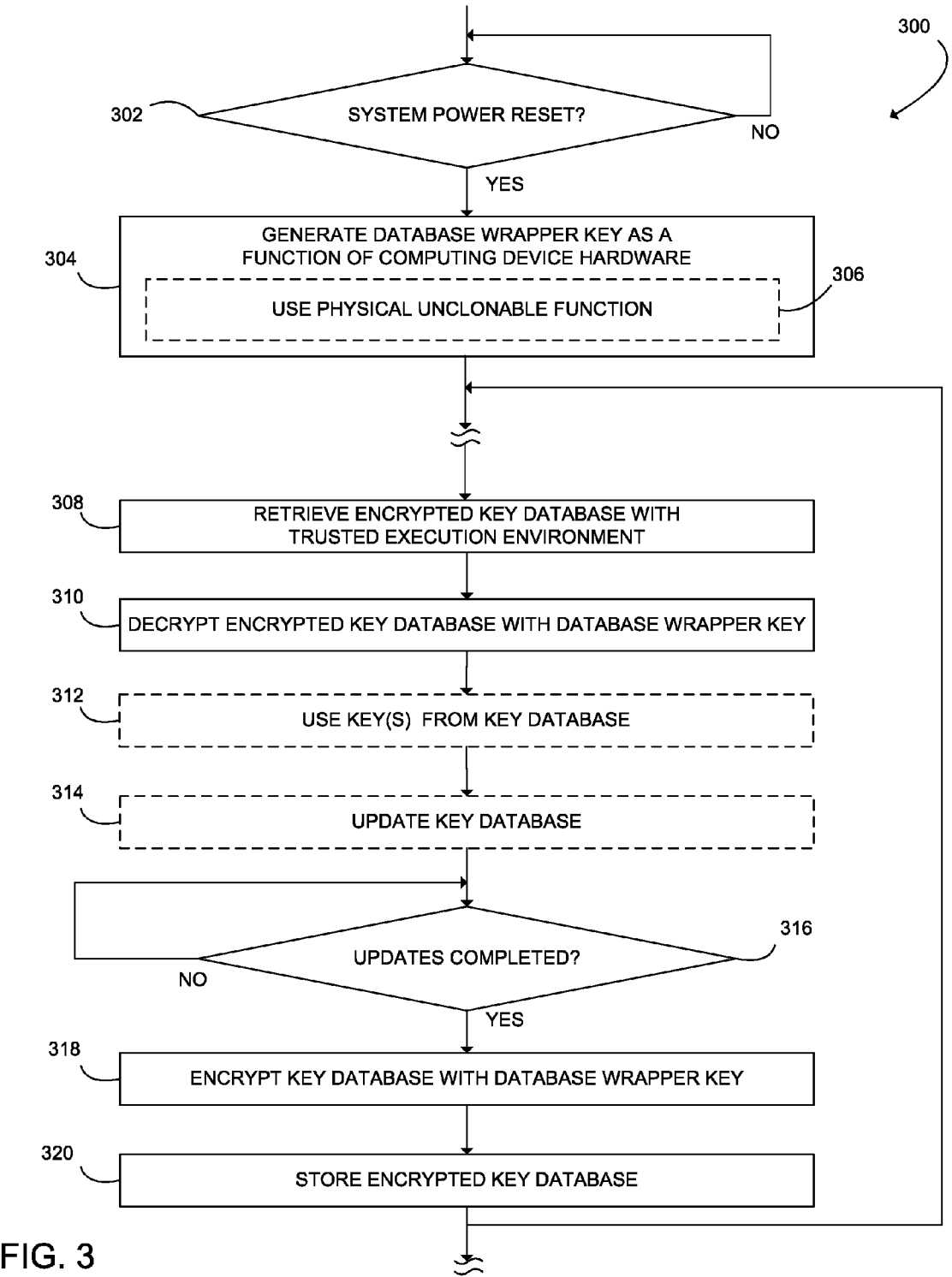
FIG. 3 is a simplified flow diagram of at least one embodiment of a method for securely accessing a key database on the local computing device of FIG. 1.

Referring now to FIG. 3, one illustrative embodiment of a method 300 for securely accessing the key database 126, which may be executed by the local computing device 102, begins with block 302. In block 302, the local computing device 102 determines whether the system power of the local computing device 102 has been reset. If so, the local computing device 102 generates the database wrapper key as a function of hardware of the local computing device 102 in block 304. That is, the database wrapper key is stored in volatile memory and re-derived each time the local computing device 102 platform is powered up. In other embodiments, the database wrapper key may not be generated until the trusted execution environment 202 needs to use it to access the cryptographic keys stored in the key database 126. In yet other embodiments, the database wrapper key may be generated by the database key generator 124 when directed to do so by the trusted execution environment 202 and immediately deleted from memory after it has been used. As discussed above, in generating the database wrapper key, the local computing device 102 may use a tamper-resistant hardware entropy source to generate the database wrapper key. In some embodiments, in block 306, the local computing device 102 may use PUFS to generate the database wrapper key.

In block 308, the local computing device 102 may retrieve the encrypted key database 126 from the data storage device 118 via the trusted execution environment 202. Within the trusted execution environment 202, the local computing device 102 may then decrypt the encrypted key database 126 with the database wrapper key generated by the database key generator 124 in block 310. After the key database 126 has been encrypted, the cryptographic keys stored in the key database 126 may be used by the trusted execution environment 202 in block 312. For example, the key database 126 may contain keys used to establish a trust anchor, public and private asymmetric keys, symmetric cryptographic keys, session keys, and/or other cryptographic keys. In block 314, the trusted execution environment 202 of the local computing device 102 may update the key database 126. For example, the trusted execution environment 202 may add cryptographic keys, delete cryptographic keys, or otherwise modify the cryptographic keys stored in the key database 126. In some embodiments, the key database 126 may be configured to store identifiers associated with a device, hardware component, entity, or relationship. In such embodiments, the trusted execution environment 202 may also update any identifiers in block 314. It should be appreciated that the key database 126 may not need to be updated in some circumstances.

In block 316, the local computing device 102 waits until the trusted execution environment 202 has finished updating the key database 126. Once the key database 126 has been updated, if at all, the trusted execution environment 202 encrypts the key database 126 using the database wrapper key in block 318. In block 320, the encrypted key database 126 is then stored in the data storage device 118 of the local computing device 102. As discussed above, in the illustrative embodiment, the key database 126 is decrypted and then re-encrypted every time the trusted execution environment 202 accesses a key stored in the key database 126. In other embodiments, the trusted execution environment 202 may decrypt the key database 126 and store the decrypted key database 126 in secure memory (e.g., secure volatile memory) accessible only to the security co-processor 122 and the trusted execution environment 202. The trusted execution environment 202 may then utilize the decrypted key database 126 and make any required updates directly through the secure memory. If there were any updates, the trusted execution environment 202 may re-encrypt the key database 126 and store the updated key database 126 to the data storage device 118. Otherwise, when the local computing device 102 powers down, the decrypted key database 126 in the volatile secure memory is deleted. It should be appreciated that the remote computing device 106 may execute a similar method to the method 400 for securely accessing the key database 150.

Figure 4:
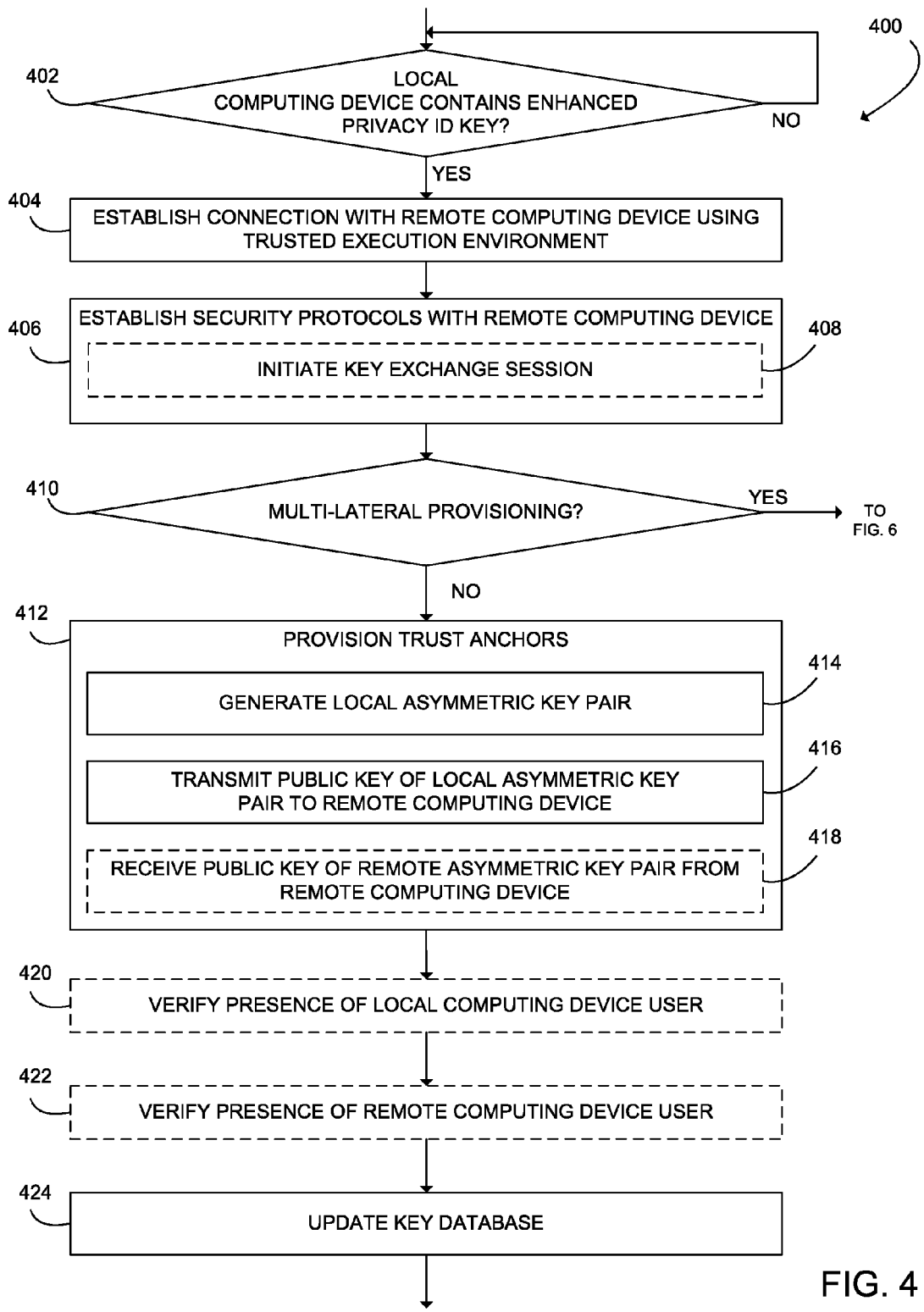
FIG. 4 is a simplified flow diagram of at least one embodiment of a method for securely provisioning a trust anchor on the local computing device of FIG. 1.

Referring now to FIG. 4, one illustrative embodiment of a method 400 for securely provisioning a trust anchor, which may be executed by the local computing device 102, begins with block 402. If the local computing device 102 has been provisioned with a set of EPID keys in block 402, then the method 400 advances to block 404. As discussed above, in some embodiments, a one-to-many cryptography scheme other than EPID may be used. In block 404, the local computing device 102 establishes a connection with the remote computing device 106 over the network 104. In doing so, the trusted execution environment 202 of the local computing device 102 may communicate with the corresponding trusted execution environment of the remote computing device 106.

Figure 5:
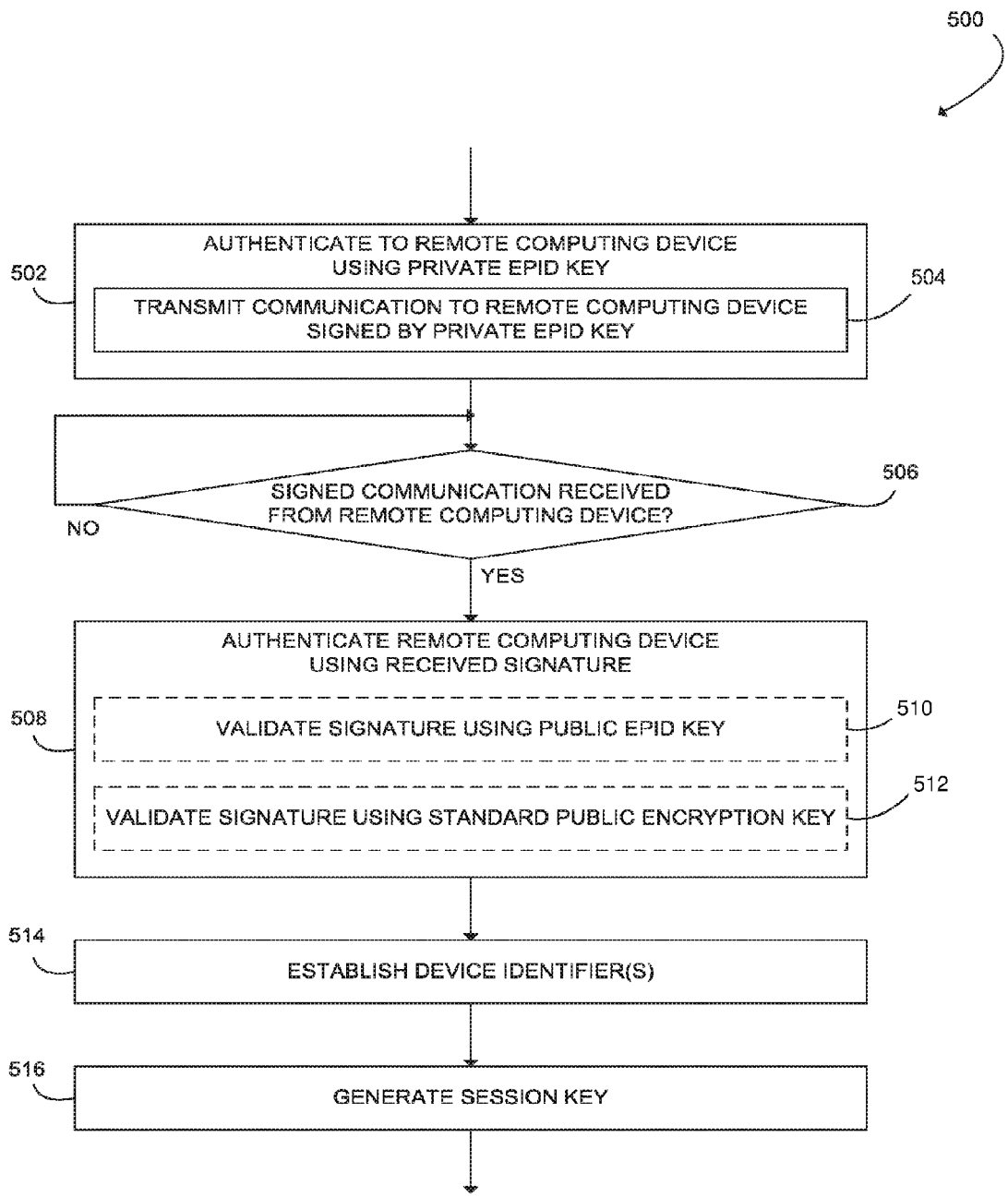
FIG. 5 is a simplified flow diagram of at least one embodiment of a method for initiating a key exchange session on the local computing device of FIG. 1.

In block 406, the local computing device 102 may establish security protocols with the remote computing device 106, which may include initiating a key exchange session with the remote computing device 106 in block 408. As indicated above, the local computing device 102 may initiate a SIGMA Sign-and-MAC session or a variant thereof with the remote computing device 106. To do so, the local computing device 102 may execute a method 500 to establish a SIGMA Sign-and-MAC session with the remote computing device 106 using EPID keys as shown in FIG. 5. The method 500 may be executed by, for example, the trusted execution environment 202 of the local computing device 102. The method 500 begins with block 502 in which the local computing device 102 authenticates to the remote computing device 106 using the local computing device 102 EPID key. For example, in block 504, the local computing device 102 may sign a communication with the private EPID key of the security co-processor 122. The local computing device 102 may then transmit the signed communication to the remote computing device 106 for authentication. Because the security co-processor 122 of the local computing device 102 and the security co-processor 146 of the remote computing device 106 belong to the same group, they share the same public EPID key. As such, the remote computing device 106 may use the public EPID key provisioned to its security co-processor 146 to validate the signature of the local computing device 102. In other embodiments, another one-to-many cryptographic scheme may be used. In such embodiments, the cryptographic keys may be provisioned into the security co-processors at manufacturing or transferred to the security co-processors sometime thereafter.

In block 506, the local computing device 102 waits until it has received a signed communication back from the remote computing device 106. Once the local computing device 102 receives a signed communication from the remote computing device 106, the local computing device 102 authenticates the remote computing device 106 in block 508. In embodiments in which bilateral trust is desired, the remote computing device 106 may sign the communication using its private EPID key. As such, in block 510, the local computing device 102 may validate the signature of the remote computing device 106 using the public EPID key stored in the security co-processor 122 of the local computing device 102. In other embodiments, only unilateral trust may be required. In such embodiments, the remote computing device 106 may sign the communication using a standard private cryptographic key. For example, the remote computing device 106 may use X.509 or another Public Key Infrastructure (PKI) scheme. That is, the remote computing device 106 may sign the communication using a private key generated with a Rivest-Shamir-Adleman (RSA) algorithm or elliptic curve cryptography. It should be appreciated that, in such embodiments, the certification path terminates with a certificate authority rather than the remote computing device 106 itself. In some embodiments, the standard cryptographic key may be provisioned to the security co-processor 146 at manufacturing time. In such unilateral trust embodiments, in block 512, the local computing device 102 may validate the signature of the remote computing device 106 using the public cryptographic key corresponding to the private cryptographic key used to sign the communication. The local computing device 102 may retrieve the public key from, for example, a public key certificate sent with the communication from the remote computing device 106.

In block 514, the local computing device 102 may establish an identifier to identify the security co-processor 146 or trusted execution environment of the remote computing device 106 or the remote computing device 106 itself for future communications. If a unilateral trust relationship is established, the local computing device 102 may use, for example, a key hash or a globally unique identifier (GUID) or other domain specific identifier to disambiguate the security co-processor 146 of the remote computing device 106. For example, the local computing device 102 may simply use the X.509 serial number or a one-time password previously provisioned to the remote computing device 106. When bilateral trust is established, the local computing device 102 may assert the selected identifier to subsequently identify the remote computing device 106. Similarly, the remote computing device 106 may select a unique identifier to identify the local computing device 102 for future communications. Additionally, each endpoint may select identifiers of their own choosing and communicate the identifier to the other device. In block 516, the local computing device 102 may generate a session key (e.g., a symmetric cryptographic key) that may be used to securely provision the trust anchors.

It should be appreciated that each of the signed communications may comprise components necessary to effect a Diffie-Hellman type key exchange. As such, the local computing device 102 may generate the session key as a function of the signed communications between the local computing device 102 and the remote computing device 106. Similarly, the remote computing device 106 may also generate the session key as a function of the signed communications. The local computing device 102 and the remote computing device 106 may use the session key or a key generated as a function of the session key to encrypt future communications between them. Thereafter, when the local computing device 102 desires to communicate with the remote computing device 106, they may negotiate a virtual private network (VPN) channel or other secure channel using the session keys. The local computing device 102 may update the key database 126 with the generated session key and/or any established identifiers by executing the method 300 shown in FIG. 3. Similarly, the remote computing device 106 may update its key database 150.

Referring back to FIG. 4, after the security protocols have been established in block 406, the trusted execution environment 202 of the local computing device 102 determines whether multilateral trust and provisioning is desired in block 410. If so, the method 400 advances to method 600 for establishing a multilateral trust relationship, which is described below in the discussion of FIG. 6. Otherwise, unilateral or bilateral provisioning is assumed and the local computing device 102 provisions the trust anchor(s) in block 412. In doing so, the local computing device 102 generates an asymmetric key pair in block 414. The asymmetric key pair may be generated using any suitable cryptographic procedure. In the illustrative embodiment, the asymmetric key pair is a standard one-to-one public-private key pair. For example, the asymmetric key pair may be generated using an RSA algorithm or elliptic curve cryptography. In other embodiments, a one-to-many asymmetric cryptographic key pair may be used. In block 416, the local computing device 102 transmits the public key of the asymmetric key pair to the remote computing device 106. To do so, the security co-processor 122 of the local computing device 102 may communicate with the security co-processor 146 of the remote computing device 106 as discussed above. This creates a trust anchor and establishes a unilateral trust relationship between the local computing device 102 and the remote computing device 106. It should be appreciated that, alternatively, the remote computing device 106 may generate the asymmetric key pair and transmit the public key to the local computing device 102.

If a bilateral trust relationship is required, the remote computing device 106 may generate a second asymmetric key pair and transmit the public key of that public-private key pair to the local computing device 102. In block 418, the local computing device 102 may receive the public key generated by the remote computing device 106. With bilateral trust, each endpoint (i.e., computing device) possesses the public key of the other endpoint after the exchange. However, with unilateral trust, only one side provisions a public key. As discussed above, the key transfers performed in block 414 may be encrypted or otherwise secured. For example, a SIGMA Sign-and-MAC session key generated in block 516 of FIG. 5 may be used to encrypt communications.

If the trusted execution environment 202 of the local computing device 102 has a security policy that requires user presence authorization in order to provision the trust anchors, the local computing device 102 may verify the presence of the local computing device 102 user in block 420. In some embodiments, the local computing device 102 may simply verify that any person is using the local computing device 102 and that it is not being operated remotely. In the illustrative embodiment, however, the local computing device 102 verifies the presence of a particular user (e.g., an administrator). To do so, the local computing device 102 may compare biometric recognition data to real-time biometric data captured from the capturing device 128. The biometric recognition data may be embodied as any type of data usable by the local computing device 102 to identify a current user of the local computing device 102 such as pre-generated biometric data, biometric feature data, biometric template data, or other data that may be used for comparison with a real-time biometric data of the current user. As discussed above, a camera may be used as a biometric capturing device 128. In such an embodiment, pre-generated pictures of an authorized user's face or facial feature data may be used as suitable biometric recognition data. The biometric recognition data may be stored in the secure memory 114 or other suitable secure storage.

The biometric capturing device 128 may capture the real-time biometric data of the user and transmit the data via the secured input/output module 206 through the secure input/output circuitry 130 (e.g., using PAVP) to the processor 108, the processor graphics circuitry, or the graphics peripheral card for processing. A suitable biometric recognition procedure may be executed to identify the current user as an authorized user or an unauthorized user. In some embodiments, verification of user presence may include providing a Turing test or a user presence test to the current user. In such embodiments, the Turing test or user presence test may be embodied as any test presented to the current user of the local computing device 102 suitable to determine that the current user is physically present. Such tests may, for example, require the user to interact with the local computing device 102 based on information displayed on a display screen of the local computing device 102.

If bilateral trust is established, the remote computing device 106 may also have a security policy that requires user presence authorization in order to provision the trust anchors. If so, the remote computing device 106 may verify the presence of the user of the remote computing device 106 in block 422. To do so, the remote computing device 106 may execute a similar process to the process executed by the local computing device 102 discussed in block 420. In block 424, the local computing device 102 may update the key database 126 with cryptographic keys generated or received while provisioning the trust anchor(s) by executing the method 300 shown in FIG. 3. The remote computing device 106 may also update its key database 150.

Figure 6:
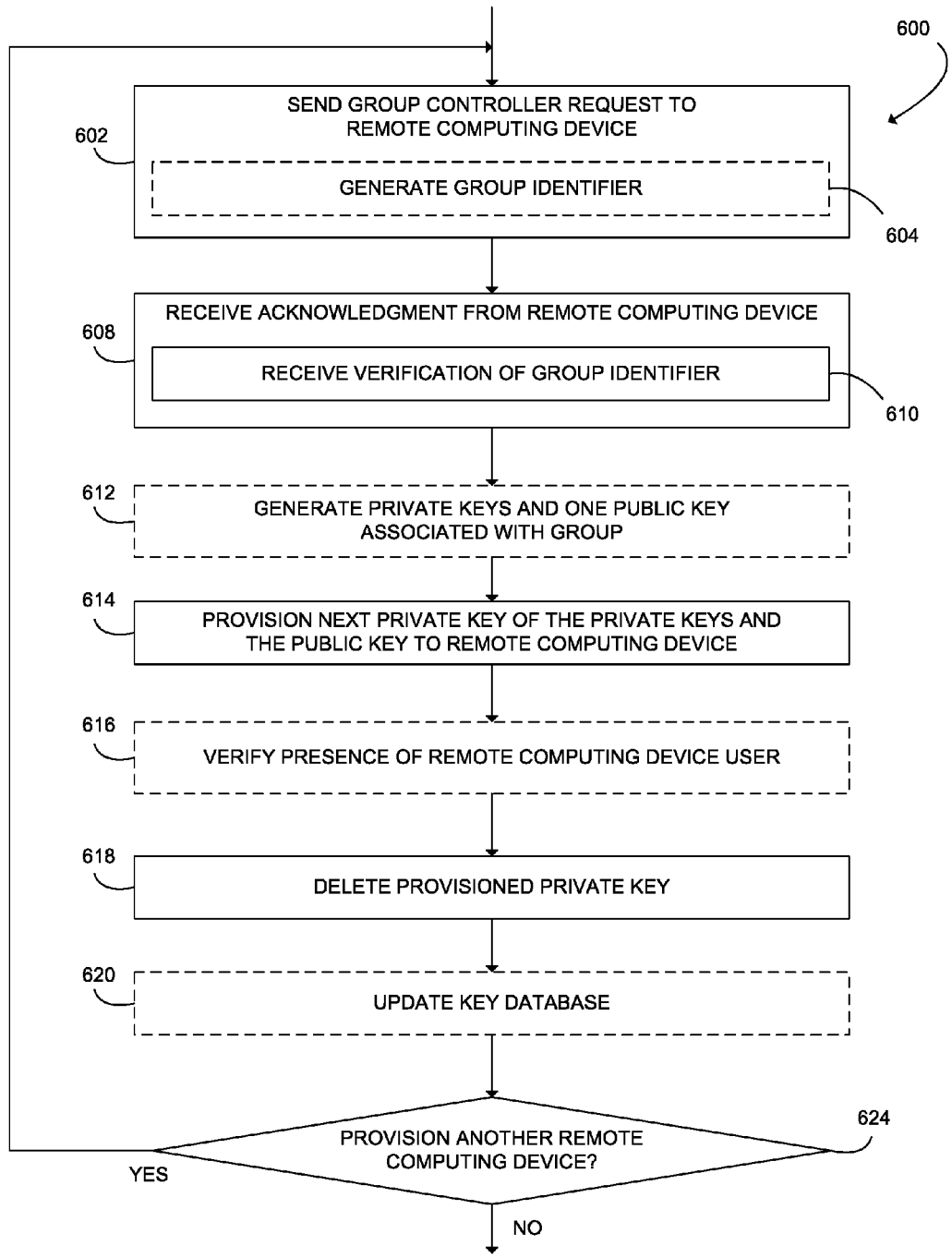
FIG. 6 is a simplified flow diagram of at least one embodiment of a method for establishing a multilateral trust relationship on the local computing device of FIG. 1.

Referring now to FIG. 6, one illustrative embodiment of a method 600 for establishing a multilateral trust relationship, which may be executed by the local computing device 102, begins with block 602. It should be appreciated that, prior to method 600, the local computing device 102 and the remote computing device 106 initiate a key exchange session (see block 408 of FIG. 4) to establish a session key such as a SIGMA Sign-and-MAC session key for use in encrypting communications or otherwise establishing a secure channel between the devices throughout method 600. In block 602, the trusted execution environment 202 of the local computing device 102 notifies the corresponding trusted execution environment of the remote computing device 106 that it would like to become a domain or group controller for a multi-way trust relationship. That is, the local computing device 102 sends a request to the remote computing device 106 to be a group controller. In doing so, the local computing device 102 may generate a group or domain identifier in block 604. For example, the local computing device 102 may generate a GUID unique to the group and indicate the generated GUID in the message to the remote computing device 106.

In block 608, the local computing device 102 receives an acknowledgment from the remote computing device 106. That is, the remote computing device 106 verifies, in block 610, that the group identifier generated by the local computing device 102 in block 604 has not already been provisioned. In block 612, the local computing device 102 may generate one-to-many asymmetric keys associated with the group using a multi-key cryptosystem. Similar to EPID keys, the local computing device 102 may generate several private keys such that each private key and the single generated public key constitute a valid asymmetric key pair. In some embodiments, these cryptographic keys may be pre-generated. In block 612, the local computing device 102 selects one of the multiple private keys generated in block 612 for the remote computing device 106. The local computing device 102 then provisions the selected private key and the public key to the remote computing device 106 through its trusted execution environment.

In block 616, if the trusted execution environment of the remote computing device 106 has a security policy that requires user presence authorization in order to provision the trust anchors, the remote computing device 106 may verify the presence of the user of the remote computing device 106 by a process similar to the process discussed in block 420. In block 618, the local computing device 102 may delete the private key provisioned to the remote computing device 106 so that it cannot be provisioned to a different remote computing device. The local computing device 102 may make any needed updates to the key database 126 in block 620. For example, the local computing device 102 may store the cryptographic keys generated in block 612 in the key database 126. In block 624, the local computing device 102 determines whether to provision another remote computing device in the multilateral trust relationship. If another remote computing device is to be provision, the method 600 returns to block 602 in which the local computing device 102 sends a group or domain controller request to the other remote computing device.

For iterations of the method 600 in provisioning remote computing devices other than the first remote computing device 106, it is unnecessary to execute the block 612 because the group keys have already been generated. Further, although not shown in the illustrative embodiment, the local computing device 102 may initiate a key exchange and establish a session key (e.g., via SIGMA Sign-and-MAC protocol) with each remote computing device to be provisioned with group keys. Any member of the group may subsequently authenticate to another member of the group using its private group key and the group identifier. As such, it follows that any two devices belonging to the group may establish unilateral or bilateral trust between them using the methods discussed herein. Similar to the EPID keys, neither member knows what other specific member of the group it is establishing a trust relationship with, but knows only that the other member is a legitimate member of the domain or group.

EXAMPLES

Illustrative examples of the devices, systems, and methods disclosed herein are provided below. An embodiment of the devices, systems, and methods may include any one or more, and any combination of, the examples described below.

Example 1 includes a local computing device for establishing a trust relationship with a remote computing device. The local computing device includes a database key generator to generate a database wrapper key as a function of hardware of the local computing device; and a trusted execution environment to (i) establish a secure connection with the remote computing device, (ii) generate a local asymmetric cryptographic key pair including a local public key and a local private key, (iii) transmit the local public key to the remote computing device, (iv) decrypt an encrypted key database stored on the local computing device using the database wrapper key, (v) store the local private key in the decrypted key database; and (vi) encrypt the key database using the database wrapper key.

Example 2 includes the subject matter of Example 1, and wherein the database key generator is to generate the database wrapper key as a function of hardware of the local computing device using a Physical Unclonable Function.

Example 3 includes the subject matter of any of Examples 1 and 2, and wherein the database key generator is to generate the database wrapper key in response to powering the local computing device.

Example 4 includes the subject matter of any of Examples 1-3, and wherein the trusted execution environment is to establish the secure connection by performing a secure cryptographic key exchange.

Example 5 includes the subject matter of any of Examples 1-4, and wherein the trusted execution environment is to establish the secure connection by establishing a unilateral or bilateral trust relationship with the remote computing device.

Example 6 includes the subject matter of Examples any of 1-5, and wherein the trusted execution environment is to establish the secure connection by initiating a SIGMA Sign-and-MAC session.

Example 7 includes the subject matter of any of Examples 1-6, wherein the trusted execution environment is to establish the secure connection by transmitting a first signed communication to the remote computing device signed by a private Enhanced Privacy Identification key stored on the local computing device; receiving a second signed communication from the remote computing device in response to transmitting the first signed communication; authenticating the second signed communication using a public key of the remote computing device; establishing a device identifier for the remote computing device; and generating a session key as a function of the first signed communication and the second signed communication.

Example 8 includes the subject matter of any of Examples 1-7, and wherein the trusted execution environment is to authenticate the second signed communication by validating the signature of the second signed communication using a public Enhanced Privacy Identification key.

Example 9 includes the subject matter of any of Examples 1-8, and wherein the trusted execution environment is to establish a device identifier by establishing a globally unique identifier for the remote computing device.

Example 10 includes the subject matter of any of Examples 1-9, and wherein the trusted execution environment is to update the decrypted key database with the session key, the device identifier, and the local public key.

Example 11 includes the subject matter of any of Examples 1-10, and wherein the trusted execution environment is to update the decrypted key database with the local public key.

Example 12 includes the subject matter of any of Examples 1-11, and wherein the trusted execution environment is to receive a remote public key of a remote public-private key pair from the remote computing device; and update the decrypted key database with the remote public key.

Example 13 includes the subject matter of any of Examples 1-12, and further includes biometric capturing device to capture real-time biometric data from a current user of the local computing device; and a processor graphics circuitry to verify the presence of the current user by comparing biometric authentication data with the captured real-time biometric data.

Example 14 includes the subject matter of any of Examples 1-13, and further includes a secured input/output circuitry, wherein the biometric authentication data and the real-time biometric data are transferred to the processor graphics circuitry through the secure input/output circuitry.

Example 15 includes the subject matter of any of Examples 1-14, and wherein the trusted execution environment is to establish the secure connection with a trusted execution environment of the remote computing device belonging to a same manufacturing group as the trusted execution environment of the local computing device.

Example 16 includes a local computing device for establishing a trust relationship with one or more remote computing devices. The local computing device includes a database key generator to generate a database wrapper key as a function of hardware of the local computing device; a trusted execution environment to (i) establish a secure connection with a remote computing device, (ii) generate multiple private keys and one public key such the one public key and each private key of the multiple private keys comprises a valid public-private cryptographic key pair, (iii) provision the one public key and an unprovisioned private key of the multiple private keys to the remote computing device, (iv) decrypt an encrypted key database of the local computing device using the generated database wrapper key, (v) update the decrypted key database based on the provisioning, and (vi) encrypt the key database using the database wrapper key.

Example 17 includes the subject matter of Example 16, and wherein the database key generator is to generate the database wrapper key as a function of hardware of the local computing device using a Physical Unclonable Function.

Example 18 includes the subject matter of any of Examples 16 and 17, and wherein the database key generator is to generate the database wrapper key in response to powering the local computing device.

Example 19 includes the subject matter of any of Examples 16-18, and wherein the trusted execution environment is to establish the secure connection by performing a secure cryptographic key exchange.

Example 20 includes the subject matter of any of Examples 16-19, and wherein the trusted execution environment is to establish the secure connection by initiating a SIGMA Sign-and-MAC session.

Example 21 includes the subject matter of any of Examples 16-20, and wherein the trusted execution environment is to establish the secure connection by transmitting a first signed communication to the remote computing device signed by a private Enhanced Privacy Identification key; receiving a second signed communication from the remote computing device; authenticating the second signed communication using a public key of the remote computing device; and generating a session key as a function of the first signed communication and the second signed communication.

Example 22 includes the subject matter of any of Examples 16-21, and wherein the trusted execution environment is to authenticate the second signed communication by validating the signature of the second signed communication using a public Enhanced Privacy Identification key.

Example 23 includes the subject matter of any of Examples 16-22, and wherein the trusted execution environment is to provision another unprovisioned private key of the multiple private keys to another remote computing device.

Example 24 includes the subject matter of any of Examples 16-23, and wherein the trusted execution environment is to transmit a group controller request to the remote computing device.

Example 25 includes the subject matter of any of Examples 16-24, and wherein the trusted execution environment is to transmit the group controller request in response to generating a group identifier.

Example 26 includes the subject matter of any of Examples 16-25, and wherein the trusted execution environment is to receive verification of the availability of the ground identifier from the remote computing device in response to transmitting the group controller request.

Example 27 includes the subject matter of any of Examples 16-26, and wherein the trusted execution environment is to update the decrypted key database based on the provisioning in response to receiving a notification from the remote computing device indicating that the remote computing device verified the presence of the user of the remote computing device.

Example 28 includes a method for securely establishing a trust relationship between a local computing device and a remote computing device. The method includes generating, on the local computing device, a database wrapper key as a function of hardware of the local computing device; establishing a secure connection between the local computing device and the remote computing device; generating, on the local computing device, a local asymmetric cryptographic key pair including a local public key and a local private key; transmitting the local public key to the remote computing device; decrypting an encrypted key database stored on the local computing device using the generated database wrapper key; storing the local private key in the decrypted key database; and encrypting the key database using the database wrapper key.

Example 29 includes the subject matter of any of Example 28, and wherein generating the database wrapper key comprises generating a database wrapper key as a function of hardware of the local computing device using a Physical Unclonable Function.

Example 30 includes the subject matter of any of Example 28 and 29, and wherein generating the database wrapper key comprises generating the database wrapper key in response to powering the local computing device.

Example 31 includes the subject matter of any of Examples 28-30, and wherein establishing the secure connection comprises performing a secure cryptographic key exchange.

Example 32 includes the subject matter of any of Examples 28-31, wherein establishing the secure connection comprises establishing a unilateral or bilateral trust relationship with the remote computing device.

Example 33 includes the subject matter of any of Examples 28-32, and wherein establishing the secure connection comprises initiating a SIGMA Sign-and-Mac session.

Example 34 includes the subject matter of Examples 28-33, wherein establishing the secure connection comprises transmitting a first signed communication to the remote computing device signed by a private Enhanced Privacy Identification key stored on the local computing device; receiving a second signed communication from the remote computing device in response to transmitting the first signed communication; authenticating the second signed communication using a public key of the remote computing device; establishing a device identifier for the remote computing device; and generating a session key as a function of the first signed communication and the second signed communication.

Example 35 includes the subject matter of any of Examples 28-34, and wherein authenticating the second signed communication comprises validating the signature of the second signed communication using a public Enhanced Privacy Identification key.

Example 36 includes the subject matter of any of Examples 28-35, and wherein establishing a device identifier comprises establishing a globally unique identifier for the remote computing device.

Example 37 includes the subject matter of any of Examples 28-36, and further includes updating the decrypted key database with the session key, the device identifier, and the local public key.

Example 38 includes the subject matter of any of Examples 28-37, and further includes updating the decrypted key database with the local public key.

Example 39 includes the subject matter of any of Examples 28-38, and further includes receiving a remote public key of a remote public-private key pair from the remote computing device; and updating the decrypted key database with the remote public key.

Example 40 includes the subject matter of any of Examples 28-39, and further includes verifying the presence of a user of the local computing device.

Example 41 includes the subject matter of any of Examples 28-40, and wherein verifying the presence of the user comprises comparing biometric authentication data with biometric data received from the user that is captured in real-time using a biometric capturing device of the computing device.

Example 42 includes a method for securely establishing a trust relationship between a local computing device and one or more remote computing devices. The method includes generating a database wrapper key as a function of hardware of the local computing device; establishing a secure connection with the remote computing device; generating multiple private keys and one public key such the one public key and each private key of the multiple private keys comprises a valid public-private cryptographic key pair; provisioning the one public key and an unprovisioned private key of the multiple private keys to the remote computing device; decrypting an encrypted key database of the local computing device using the generated database wrapper key; updating the decrypted key database based on the provisioning; and encrypting the key database using the database wrapper key.

Example 43 includes the subject matter of Example 42, and wherein generating the database wrapper key comprises generating a database wrapper key as a function of hardware of the local computing device using a Physical Unclonable Function.

Example 44 includes the subject matter of any of Examples 42 and 43, and wherein generating the database wrapper key comprises generating the database wrapper key in response to powering the local computing device.

Example 45 includes the subject matter of any of Examples 42-44, and wherein establishing the secure connection comprises performing a secure cryptographic key exchange.

Example 46 includes the subject matter of any of Examples 42-45, and wherein establishing the secure connection comprises initiating a SIGMA Sign-and-Mac session.

Example 47 includes the subject matter of any of Examples 42-46, and wherein establishing the secure connection comprises transmitting a first signed communication to the remote computing device signed by a private Enhanced Privacy Identification key; receiving a second signed communication from the remote computing device; authenticating the second signed communication using a public key of the remote computing device; and generating a session key as a function of the first signed communication and the second signed communication.

Example 48 includes the subject matter of any of Examples 42-47, and wherein authenticating the second signed communication comprises validating the signature of the second signed communication using a public Enhanced Privacy Identification key.

Example 49 includes the subject matter of any of Examples 42-48, and further includes provisioning another unprovisioned private key of the multiple private keys to another remote computing device.

Example 50 includes the subject matter of any of Examples 42-49, and further includes transmitting a group controller request to the remote computing device.

Example 51 includes the subject matter of any of Examples 42-50, and wherein transmitting the group controller request comprises generating a group identifier.

Example 52 includes the subject matter of any of Examples 42-51, and further includes receiving verification of the availability of the ground identifier from the remote computing device in response to transmitting the group controller request.

Example 53 includes the subject matter of any of Examples 42-52, and further includes verifying the presence of the user of the remote computing device.

Example 54 includes the subject matter of any of Examples 42-53, and wherein verifying the presence of the user comprises comparing biometric authentication data with biometric data received from the user that is captured in real-time using a biometric capturing device of the computing device.

Example 55 includes one or more machine readable media comprising a plurality of instructions stored thereon that in response to being executed by a computing device results in performing any of Examples 28-54.

The invention claimed is:

1. A local computing device comprising:
   a processor including at least one core;
   a database key generator to generate a database wrapper key as a function of hardware of the local computing device; and
   a security co-processor coupled to the database key generator, the security co-processor to establish a trusted execution environment to (i) establish a secure connection with a remote computing device by:
   transmission of a first signed communication to the remote computing device signed by a private Enhanced Privacy Identification key stored on the local computing device;
   receipt of a second signed communication from the remote computing device in response to transmission of the first signed communication;
   authentication of the second signed communication using a public key of the remote computing device;
   establishment of a device identifier for the remote computing device; and
   generation of a session key as a function of the first signed communication and the second signed communication;
   (ii) generate a local asymmetric cryptographic key pair including a local public key and a local private key, (iii) transmit the local public key to the remote computing device, (iv) decrypt an encrypted key database stored on the local computing device using the database wrapper key, the encrypted key database and the database wrapper key inaccessible to the processor, (v) store the local private key in the decrypted key database, and (vi) encrypt the key database using the database wrapper key.

2. The local computing device of claim 1, wherein the database key generator is to generate the database wrapper key as a function of hardware of the local computing device using a Physical Unclonable Function in response to powering the local computing device.

3. The local computing device of claim 1, wherein the trusted execution environment is to authenticate the second signed communication by validating the signature of the second signed communication using a public Enhanced Privacy Identification key.

4. The local computing device of claim 1, wherein the trusted execution environment is to:
establish the device identifier by establishing a globally unique identifier for the remote computing device; and
update the decrypted key database with the session key, the device identifier, and the local public key.

5. The local computing device of claim 1, wherein the trusted execution environment is to:
receive a remote public key of a remote public-private key pair from the remote computing device; and
update the decrypted key database with at least one of: the remote public key and the local public key.

6. The local computing device of claim 1, further comprising:
a biometric capturing device to capture real-time biometric data from a current user of the local computing device;
a processor graphics circuitry to verify the presence of the current user by comparing biometric authentication data with the captured real-time biometric data; and
a secured input/output circuitry, wherein the biometric authentication data and the real-time biometric data are transferred to the processor graphics circuitry through the secure input/output circuitry.

7. The local computing device of claim 1, wherein the trusted execution environment is to establish the secure connection with a trusted execution environment of the remote computing device belonging to a same manufacturing group as the trusted execution environment of the local computing device.

8. A local computing device comprising:
a processor including at least one core;
a database key generator to generate a database wrapper key as a function of hardware of the local computing device;
a security co-processor coupled to the database key generator, the security co-processor to establish a trusted execution environment to (i) establish a secure connection with a remote computing device by:
transmission of a first signed communication to the remote computing device signed by a private Enhanced Privacy Identification key;
receipt of a second signed communication from the remote computing device;
authentication of the second signed communication using a public key of the remote computing device; and
generation of a session key as a function of the first signed communication and the second signed communication;
(ii) generate multiple private keys and one public key such that the one public key and each private key of the multiple private keys comprises a valid public-private cryptographic key pair, the one public key associated with a group of computing devices including the local computing device and the remote computing device and the multiple private keys comprising group private keys, (iii) provision the one public key and an unprovisioned private key of the multiple private keys to the remote computing device, (iv) decrypt an encrypted key database of the local computing device using the generated database wrapper key, (v) update the decrypted key database based on the provisioning, and (vi) encrypt the key database using the database wrapper key.

9. The local computing device of claim 8, wherein the database key generator is to generate the database wrapper key as a function of hardware of the local computing device using a Physical Unclonable Function.

10. The local computing device of claim 8, wherein the database key generator is to generate the database wrapper key in response to powering the local computing device.

11. The local computing device of claim 10, wherein the trusted execution environment is to authenticate the second signed communication by validating the signature of the second signed communication using a public Enhanced Privacy Identification key.

12. The local computing device of claim 8, wherein the trusted execution environment is to provision another unprovisioned private key of the multiple private keys to another remote computing device.

13. The local computing device of claim 8, wherein the trusted execution environment is to:
transmit a group controller request to the remote computing device in response to generating a group identifier; and
receive verification of the availability of the group identifier from the remote computing device in response to transmitting the group controller request.

14. The local computing device of claim 8, wherein the trusted execution environment is to update the decrypted key database based on the provisioning in response to receiving a notification from the remote computing device indicating that the remote computing device verified the presence of the user of the remote computing device.

15. One or more non-transitory machine-readable storage media comprising a plurality of instructions stored thereon that, in response to being executed, result in a computing device:
generating a database wrapper key as a function of hardware of the computing device;
establishing a secure connection with a remote computing device comprising:
transmitting a first signed communication to the remote computing device signed by a private Enhanced Privacy Identification key stored on the computing device;
receiving a second signed communication from the remote computing device in response to transmitting the first signed communication;
authenticating the second signed communication using a public key of the remote computing device;
establishing a device identifier for the remote computing device; and
generating a session key as a function of the first signed communication and the second signed communication;
generating a local asymmetric cryptographic key pair including a local public key and a local private key;
transmitting the local public key to the remote computing device;
decrypting an encrypted key database stored on the computing device using the generated database wrapper key;
storing the local private key in the decrypted key database; and
encrypting the key database using the database wrapper key.

16. The one or more non-transitory machine-readable storage media of claim 15, wherein generating the database wrapper key comprises generating a database wrapper key as a function of hardware of the computing device using a Physical Unclonable Function in response to powering the computing device.

17. The one or more non-transitory machine-readable storage media of claim 15, wherein authenticating the second signed communication comprises validating the signature of the second signed communication using a public Enhanced Privacy Identification key.

* * * * *